United States Patent
Beskrovny

(10) Patent No.: US 8,850,466 B2
(45) Date of Patent: Sep. 30, 2014

(54) METHOD AND SYSTEM FOR THE DETERMINATION OF A PRESENT VIEWER IN A SMART TV

(71) Applicant: Samsung Electronics Co., Ltd., Gyeonggi-do (KR)

(72) Inventor: Evgeny Beskrovny, Ramat Gan (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/764,906

(22) Filed: Feb. 12, 2013

(65) Prior Publication Data

US 2014/0229965 A1 Aug. 14, 2014

(51) Int. Cl.
*H04H 60/32* (2008.01)
*H04N 21/442* (2011.01)

(52) U.S. Cl.
CPC ............... *H04N 21/44213* (2013.01)
USPC ............................................. 725/14; 725/9

(58) Field of Classification Search
None
See application file for complete search history.

(56) References Cited

U.S. PATENT DOCUMENTS

| | | | |
|---|---|---|---|
| 8,104,057 B2 | 1/2012 | Lee | |
| 2003/0028871 A1* | 2/2003 | Wang et al. | 725/9 |
| 2003/0061183 A1* | 3/2003 | Schaffer et al. | 706/8 |
| 2003/0237093 A1* | 12/2003 | Marsh | 725/46 |
| 2004/0054726 A1* | 3/2004 | Doss et al. | 709/205 |
| 2008/0022312 A1* | 1/2008 | Benco et al. | 725/58 |
| 2008/0092199 A1* | 4/2008 | McCarthy et al. | 725/133 |
| 2008/0109843 A1* | 5/2008 | Ullah | 725/34 |
| 2009/0265737 A1* | 10/2009 | Issa et al. | 725/38 |
| 2010/0205628 A1* | 8/2010 | Davis et al. | 725/25 |
| 2011/0115877 A1 | 5/2011 | Kang | |
| 2012/0011529 A1* | 1/2012 | Howcroft et al. | 725/14 |
| 2012/0271641 A1* | 10/2012 | Kim | 704/275 |
| 2012/0296488 A1* | 11/2012 | Dharwada et al. | 700/296 |
| 2014/0059608 A1* | 2/2014 | Beattie et al. | 725/39 |

OTHER PUBLICATIONS

USBDevice, "How to configure DLNA between Windows Phone and Windows 7", Jul. 9, 2012, WMPoweruser.*

* cited by examiner

*Primary Examiner* — Hunter B Lonsberry
*Assistant Examiner* — Cynthia Fogg
(74) *Attorney, Agent, or Firm* — Roach Brown McCarthy & Gruber, P.C.; Kevin D. McCarthy

(57) ABSTRACT

The invention relates to a system for determining a list of currently watching one or more viewers of a smart TV, which comprises at the smart TV: (a) a mobile phone connection unit for detecting pre-registered telephones of potential viewers that are within a short range from the TV; (b) a normal schedule unit for pre-recording for each potential viewer his normal schedule; (c) a recent activity monitoring unit for recording recent viewers activity within the smart TV; and (d) a viewer determination unit for receiving data from said mobile phone connection unit, from said normal schedule unit, and from said recent activity unit, and for determining from said data a list of one or more currently watching viewers of the TV.

7 Claims, 1 Drawing Sheet

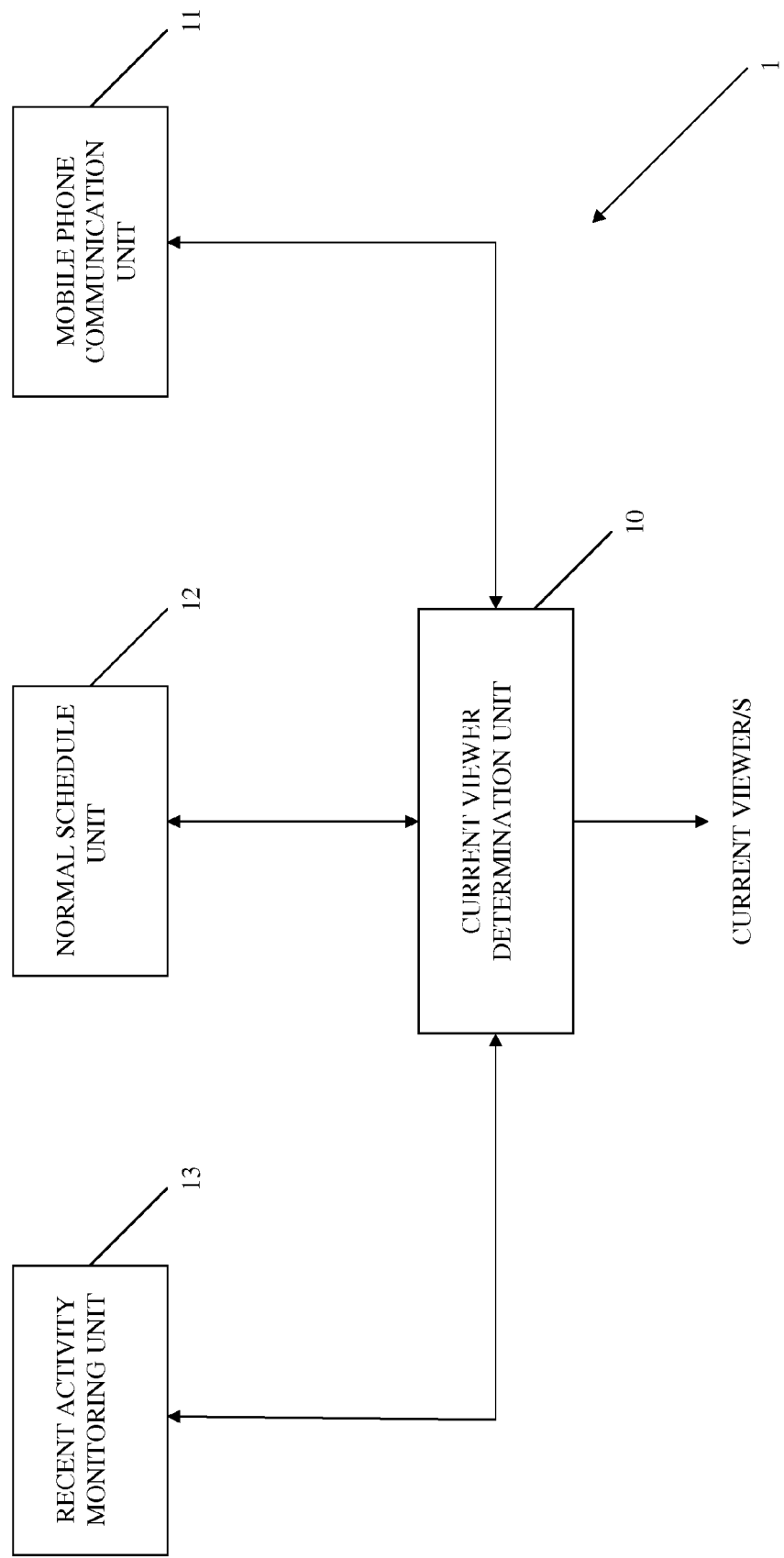

METHOD AND SYSTEM FOR THE DETERMINATION OF A PRESENT VIEWER IN A SMART TV

FIELD OF THE INVENTION

The invention relates to the field of privileges and content adaptation. More specifically, the invention relates to a method and system for determination of the present one or more viewers of a smart TV.

BACKGROUND OF THE INVENTION

The smart TV standard has been designed to provide an enhanced experience to the viewer over the traditional TV. A smart TV typically has two separate inputs: (a) a traditional TV port for receiving traditional TV channels from a TV content provider, e.g., cables or satellite provider; and (b) an Internet port for receiving TV channels from the Internet. The viewer can select at any given time whether to view a channel through the traditional port or through the Internet port. While the traditional TV has not changed much over the recent years, it becomes apparent that the essence of the smart TV resides in the Internet mode watching, which provides many enhanced features to the viewer, features that do not exist in the traditional mode of watching, such as chatting with others while watching a TV channel, accessing and activating features of Facebook and Twitter while using the TV screen and remote control, displaying contents from mobile devices on the TV screen, and more.

As can be seen, the smart TV combines features of a personal computer with features of the traditional TV. However, there are still differences between the typical computer and the TV set that make some of the smart TV functionalities less convenient. For example, while the typical personal computer is designed to support sessions that are dedicated to a specific single user who has presently logged in to the computer, the smart TV is naturally designed to support simultaneous viewing of multiple users. More specifically, while the computer allows specific definitions for the currently logged in user, such as loading of a respective profile for the user, and his privileges, this is not the case in the smart TV. In this respect, the knowledge of the present user has many additional aspects in the personal computer. For example, knowledge of the presently logged in user allows an instant messenger application to load a list of friends of this user, or to activate the respective persistent cookies associated with that user in order to give an immediate access to the specific user email account.

To summarize, while the smart TV combines functionalities of a personal computer, it is still poorly suited for multiple login and logout of users. Normally, the smart TV does not have a keyboard, and even in cases where a keyboard is used, it is highly unlikely that people will log in and log out every time they turn on the smart TV, or when they simply leave the room and others come in to watch the smart TV. This problem raises a need for a better solution, i.e., enabling the smart TV to automatically determine the one or more current viewers, in order to adapt its content to those present viewers. One purpose of this content adaptation is, for example, a parental control. Another exemplary purpose is the adaptation of the advertisements to the viewers.

Presently, the Smart TV does not predict who is currently watching the TV, and does not adapt the content to the present viewer. There are known, however, techniques that are based on biometry like face recognition, shape recognition and others, and these techniques are even used for gesture operation of TVs. Moreover, these techniques require use of complex and expensive equipment, special conditions and requirement in the room such as illumination, and require the viewer to be visible. Moreover, the appearance of the viewer may change from time to time, for example, he may wear glasses, or grow a beard, cases that may disturb and corrupt the determinations by these techniques. Clearly, such conditions cannot always be met, and therefore there is a need to provide a solution which is independent from biometry.

It is therefore an object of the present invention to provide a system and method for determining by a smart TV the identity of the current viewers.

It is still another object of the present invention to provide said system and method that are independent from biometry.

It is still another object of the present invention to provide said method and system that are simple in structure, and do not require use of complex and expensive equipment.

Other objects and advantages of the invention will become apparent as the description proceeds.

SUMMARY OF THE INVENTION

The invention relates to a system for determining a list of currently watching one or more viewers of a smart TV, which comprises at the smart TV: (a) a mobile phone connection unit for detecting pre-registered telephones of potential viewers that are within a short range from the TV; (b) a normal schedule unit for pre-recording for each potential viewer his normal schedule; (c) a recent activity monitoring unit for recording recent viewers' activity within the smart TV; and (d) a viewer determination unit for receiving data from said mobile phone connection unit, from said normal schedule unit, and from said recent activity unit, and for determining from said data a list of one or more currently watching viewers of the TV.

Preferably, said mobile phone connection unit is a Bluetooth unit, and wherein said step of pre-registration of potential viewers telephones involves registration of a Bluetooth address of said telephone and the respective telephone holder.

Preferably, said mobile phone connection unit is an AllShare unit, and wherein said pre-registration of potential viewers' telephones involves registration of an AllShare address of said telephone and the respective telephone holder.

System according to claim 1, wherein the pre-recording at the normal schedule unit comprises for each potential viewer times that he is expected to be at home, times that he expected to be away from home, and times that he is expected to be away from home, but leaving his mobile phone at home.

Preferably said recent activity monitoring unit records recent activities on the TV, and the respective user who performed this activity, and wherein this recent activity recording spans up to 30 minutes.

Preferably, said determination of current viewers is performed periodically. System according to claim 1 wherein said determination of current viewers is performed upon each switch of a channel at the TV.

The invention further relates to a method for determining one or more currently watching viewers of a smart TV, which comprises the steps of: (a) preparing a list of potential viewers; (b) preparing a normal schedule for each of said potential viewers; (c) preparing a list of mobile phones that belong respectively to each of said viewers, each of said phones are capable of accessing the smart TV from a short range; (d) providing means for monitoring recent activities on the smart TV and a viewer who performed said activities; (e) determining those mobile phones that are in close range from the TV, and their respective owners; (f) determining recent activities on the TV and the respective persons that performed these activities; and (g) calculating an estimation for the current one or more TV viewers based on data relating to: current time; mobile phones that are currently found to be within said short range from the TV; (h) said normal schedules of said potential viewers; and the viewers that have been detected to perform said recent activities.

BRIEF DESCRIPTION OF THE DRAWINGS

In the drawings:

FIG. 1 illustrates in a general block diagram form a system 1 for determining the one or more viewers that are currently watching the smart TV.

DETAILED DESCRIPTION OF PREFERRED EMBODIMENTS

The invention provides means for the smart TV to determine, or at least predict the identities of the current viewers. FIG. 1 illustrates in a general block diagram form a system 1 for determining viewers that are currently watching the TV. The system comprises a viewer determination unit 10, which evaluates inputs from three different sources, as follows: (a) a mobile phone connection unit 11; (b) a normal schedule unit 12; and (c) a recent activity monitoring unit 13. Based on said inputs, the viewer determination unit concludes and outputs a list of present viewers that presently watch the smart TV.

The determination by the viewer determination unit 11 is based on an initial step in which all the relevant data relating to potential viewers are defined within the smart TV. Normally, this is presently the case with existing smart TV, however, as will be noted, the invention requires the provision of some additional data that will be apparent as the description proceeds. For example, according to the present invention the names of all the viewers, their respective ages, respective personal phone's Bluetooth address, and their respective normal schedules are defined within the smart TV, in addition to normal definitions that are commonly made. It should be noted that commonly some of these definitions are in any case made within existing smart TVs.

The mobile phone connection unit 11 searches mobile phones within a short range, typically of several meters, or up to a few tens of meters. All smart TVs are provided with a Bluetooth module as a standard, for enabling users to connect to the TV for a variety of purposes, such as, transferring images from the phone to the screen, for transferring video to the screen, for playing on the TV music which is stored at the phone, etc. The mobile phone connection unit 11 therefore uses its Bluetooth module to determine those mobile phones that are within this short range, and it is assumed that if a user telephone is within a short range from the TV, he indeed watches the TV, or he is at least potentially viewing the TV. As will be noted, the final decision is made by the viewer determination unit based on several other criteria. The mobile phone connection unit 11 may also apply, in addition, or as an alternative to the Bluetooth module, another short range connection standard such as AllShare or equivalent.

AllShare" is an interface to share media between various electronic devices. By using a wireless network enabled devices can share digital information. For example an AllShare" enabled phone can be accessed to watch digital content or listen to Music on an AllShare" enabled smart TV. Similarly, a smart TV can access web content from an AllShare enabled phone, like watching Youtube through the phone's data service. Other services of the AllShare include using the phone as a remote control, watching movies from computers and other devices that are on the network. Similar to the Bluetooth module, also AllShare may be used to determine whether a mobile device of a potential viewer is within the range, and if so, this potential viewer is assumed as watching the TV.

As noted, also AllShare or a similar communication protocol between the smart TV and a mobile phone may be used to determine whether one of the potential viewers are within the range, and as a result that they are viewing the TV. On the other hand, if it is determined that the TV is ON, while there is no telephone within the range, it can be concluded that one of the children in the family, which has no a mobile phone is watching the TV.

The normal schedule unit 12 is another source for essential data to the viewer determination unit 10. The normal schedule unit 12 is a weekly or monthly scheduler which contains the normal schedules of each of the family members.

For example, the schedule may include data such as:

For the father:
a. Working hours: Monday through Friday 8:00-18:30. That means that the father normally is out of home during these hours;
b. At home: All the hours within the various weekdays that the father is normally at home;
c. Out of the home: All the hours within the various weekdays that the father is normally out of the home.
d. Out of home, but leaving the mobile phone at home: All the hours within the weekdays that the father is normally out of the home, but does not take with him his mobile phone. This information is important, as existence of the telephone within the range will not be considered the father is indeed at home.

For the older child:
a. Studying hours: Monday through Friday 8:00-13:30. That means that the older child is normally out of home during these hours;
b. At home: All the hours within the weekdays that the older child is normally at home;
c. Out of the home: All the hours within the weekdays that the older child is normally out of the home.
d. Out of home, but leaving the mobile phone at home: this may be left empty if the older child does not have a mobile phone.

Similar normal schedule lists are provided within the normal schedule unit 12 for the rest of the family members (i.e., for the mother, and additional children).

These lists are provided to the viewer determination unit 10 and form a good basis for the estimation of the present one or more viewers, as determined by said latter unit.

The recent activity monitoring unit 13 provides still additional indications with respect to the possible current viewers to the viewer determination unit 10. More specifically, recent activity monitoring unit monitors and analyzes recent activities that are made on the TV in a recent period of, for example last 20-30 minutes. Normally, there are actions within the TV that can form an indication with respect to the person who performed such actions, for example:

a. If the father has accessed 5 minutes ago his personal email using the smart TV, it can be assumed with relatively high probability that he is now watching the TV.
b. If the mother had a chat session 10 minutes ago, it can be assumed that she is now watching the TV.
c. If the presently watched channel is, for example a channel dedicated to children, it can be assumed that one of the children now watches the smart TV.
d. Other similar activities may be monitored by the recent activity monitoring unit 13 as well, and altogether, this monitoring results form a valuable basis for the purpose of determining the present viewers by the viewer determination unit 10.

As noted, the viewer determination unit 10 receives inputs from the following three sources: (a) the mobile phone connection unit 11; (b) the normal schedule unit 12; and (c) the recent activity monitoring unit 13. While providing a predefined weight to each of said inputs, the viewer determination unit 10 calculates estimation for the current TV viewers. Moreover, the viewer determination unit 10 may be adaptive in such a manner that he learns from the data it receives from units 11-13, and updates the storage in said units such that future estimations are improved. Moreover, the weight which given to each of the inputs may be adjusted accordingly. For example, if the normal schedule unit shows that the father is at work between 8:30-18:30, but in fact it is found that his mobile phone is detected by unit 11 frequently at 17:30, the viewer determination unit updates the normal schedule unit accordingly, and the future calculations are improved in this regard. Similarly, if a frequent access to the mother's mailbox is detected at 10:00 am, while she supposed to be at work, the viewer determination unit similarly updates the mother's normal schedule. These are only examples for the manner of adaptation by the viewer determination unit, and other similar adaptation criteria may be applied.

It should be noted that preferably the system of the invention tries to identify a single viewer who presently watches the TV, and when several viewers are found, the system tries to identify a "most dominant viewer" based on the analysis as discussed above. In another embodiment, the system may allow identification of more than one viewer.

The invention also relates to a method for determining the current viewers of a smart TV which comprises the steps of:
a. Preparing a list of potential viewers;
b. Preparing a normal schedule for each of said potential viewers;
c. Preparing a list of mobile phones that belong respectively to each of said viewers, phones that are capable of accessing the smart TV from a short range;
d. Providing means for monitoring recent activities on the smart TV and While the smart TV operates:
e. Determining those mobile phones that are in close range from the TV, and their respective owners;
f. Determining the recent activities on the TV and the respective persons that performed these activities;
g. Calculating an estimation for the current one or more TV viewers based on data relating to:
  e.1. current time;
  e.2. Mobile phones that are currently found to be within said short range from the TV;
  e.3. Said normal schedules of said potential viewers; and
  e.4. Said recent activities as determined.

It should be noted that the time of calculation of presently watching viewers may be periodic, upon any switch to a new station, or otherwise. Moreover, the basic data relating to the users, their normal schedules, and their mobile phones may be entered once, for example, upon purchase of the smart TV. This data may be updated any time later on by the users, or by the adaptive process of the viewer determination unit.

Example

The present time is 15:30. The viewer switches the TV channel. Mobile phone connection unit 11 reports that the none of the mother's or father's phones are within the short range from the TV. Furthermore, the normal schedule unit 12 reports that the mother supposed to be at this time at a yoga lesson, and the father at work. Moreover, the schedules of the two children show that they are supposed to be at home. The recent activity monitoring unit 13 confirms that no recent activities are found for either the mother or father during the last 20 minutes. The watched channel is the Disney channel. Moreover, the recent activity shows that the older child has accessed his Facebook page about 6 minutes ago. Based on the above information, the viewer determination unit concludes that either the older son watches the TV, or both the son and daughter watch the TV together. In this regard, the invention is also adapted for cases in which the mobile phone is detected, but the phone holder is not at home. For example, if the mother routinely goes to a yoga lesson on Tuesday, 15:00, but commonly leaves the phone at home, she can indicate this fact at her own section within the normal schedule unit 12, such that the viewer determination unit will not conclude that the mother is at home based on the fact that her telephone is presently detected within a short range.

As shown, the invention provides a simple system and respective method for determining presently watching viewers of a smart TV, wherein the system and method are simple in structure, independent from use of biometry, and independent from registration of logging in and out by the potential viewers. In fact, the smart TV of the invention does not require any additional hardware beyond the hardware which is conventionally included in smart TVs.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A system for determining a list of currently watching one or more viewers of a smart TV, which comprises at the smart TV:
  a) a mobile phone connection unit for detecting pre-registered telephones of potential viewers that are within a short range from the TV;
  b) a normal schedule unit for pre-recording for each potential viewer his normal schedule;
  c) a recent activity monitoring unit for recording recent viewers' activity within the smart TV; and
  d) a viewer determination unit for receiving data from said mobile phone connection unit, from said normal schedule unit, and from said recent activity unit, and for determining from said data a list of one or more currently watching viewers of the TV;
  wherein the pre-recording at the normal schedule unit comprises for each potential viewer times that he is expected to be at home, times that he expected to be away from home, and times that he is expected to be away from home, but leaving his mobile phone at home.

2. System according to claim 1, wherein said mobile phone connection unit is a Bluetooth unit, and wherein said pre-registration of potential viewers' telephones involves registration of a Bluetooth address of said telephone and the respective telephone holder.

3. System according to claim 1, wherein said mobile phone connection unit is an AllShare unit, and wherein said step of pre-registration of potential viewers' telephones involves registration of an AllShare address of said telephone and the respective telephone holder.

4. System according to claim 1, wherein said recent activity monitoring unit records recent activities on the TV, and the respective user who performed this activity, and wherein this recent activity recording spans up to 30 minutes.

5. System according to claim 1 wherein said determination of current viewers is performed periodically.

6. System according to claim 1 wherein said determination of current viewers is performed upon each switch of a channel at the TV.

7. A method for determining one or more currently watching viewers of a smart TV, which comprises the steps of:
 a) preparing a list of potential viewers;
 b) preparing a normal schedule for each of said potential viewers;
 c) preparing a list of mobile phones that belong respectively to each of said viewers, each of said phones are capable of accessing the smart TV from a short range;
 d) providing a list which indicates, for each of said potential users, his recent activities on the smart TV respectively;
 e) determining those mobile phones that are in close range from the TV, and their respective owners;
 f) determining recent activities on the TV and the respective persons that performed these activities and updating respectively said list of recent activities; and
 g) calculating an estimation for the current one or more TV viewers based on data relating to: current time; mobile phones that are currently found to be within said short range from the TV; said normal schedules of said potential viewers; and, the viewers that have been detected to perform said recent activities;
 wherein the pre-recording at the normal schedule unit comprises for each potential viewer times that he is expected to be at home, times that he expected to be away from home, and times that he is expected to be away from home, but leaving his mobile phone at home.

* * * * *